United States Patent Office 3,809,710
Patented May 7, 1974

---

3,809,710
ESTERS OF 9-OXA-2,4-ALKADIENOIC ACIDS
Vaclav Jarolim, Karel Slama, and Frantisek Sorm, Prague, Czechoslovakia, assignors to Ceskoslovenska Akademie Ved., Prague, Czechoslovakia
No Drawing. Filed July 3, 1972, Ser. No. 268,427
Claims priority, application Czechoslovakia,
July 19, 1971, 5,304/71
Int. Cl. A01n 9/24; C07c 69/66
U.S. Cl. 260—410.9 R  10 Claims

ABSTRACT OF THE DISCLOSURE

Novel esters of 9-oxa-2,4-alkadienoic acids, intermediates therefor, synthesis thereof, and the control of insects.

---

The invention relates to insect control, insect control agents and intermediates therefor, and synthesis thereof.

Numerous juvenile-hormone-like substances have been recently discovered which stimulate the larval development, inhibit the larval metamorphosis, and are essential for the ovarian growth in adult females.

Compounds, the preparation and use of which are claimed in the present patent application, are novel analogues of the insect juvenile hormone, namely, novel esters of 9-oxa-2,4-alkadienoic acids containing 11–15 atoms in their chain and substituted at positions 3, 7 and 10 or 3, 7 and 11 by an alkyl group.

The present invention relates to insect control, the active substance of which comprises novel esters of 9-oxa-2,4-alkadienoic acids as well as their cis- and trans-isomers and intermediates, according to Formula I:

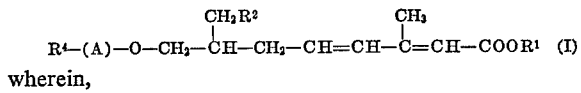

wherein, (A) is

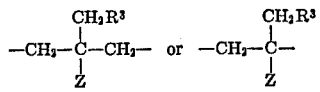

$R^1$ is lower alkyl consisting of 1–6 carbon atoms;
$R^2$ and $R^3$ is hydrogen or methyl;
$R^4$ is hydrogen or lower alkyl consisting of 1–3 carbon atoms; and
Z is hydrogen or methyl.

Hereinafter, each of $R^1$–$R^4$, Z and (A) is as defined above, unless otherwise specified.

The invention relates also to a process of preparing novel esters of 9-oxa-2,4-alkadienoic acids according to Formula I as well as their isomers and intermediates, which process comprises oxidizing an alkoxyalcohol according to Formula II:

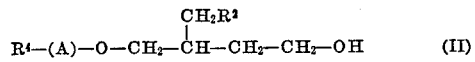

thereby forming an aldehyde according to Formula III:

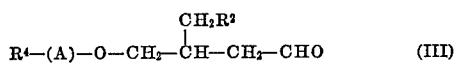

and treating the latter aldehyde (III) with a dialkyl 3-alkoxy-carbonyl-2-methyl-2-propenephosphonate according to Formula IV:

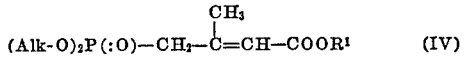

wherein Alk is lower alkyl, thereby forming an ester of 9-oxa-2,4-alkadienoic acid according to Formula I.

The advantageous reaction conditions for the individual steps of preparing the novel compounds according to the present invention are the following.

(1) Oxidation of alcohols according to Formula II to give aldehydes according to Formula III is performed preferably with chromium trioxide in pyridine.

(2) Treatment of aldehydes according to Formula III with dialkyl 3 - alkoxycarbonyl-2-methyl-2-propenephosphonates according to Formula IV is performed in dimethylformamide in the presence of alkali metal alkoxides or hydrides, such as sodium methoxide, sodium ethoxide or sodium hydride.

(3) Reaction products obtained by procedure of paragraph (2) are separated by adsorption chromatography on silica gel or by gas chromatography.

Alcohols of Formula II can be prepared as described in application Ser. No. 193,212, filed Oct. 27, 1971, the disclosure of which is incorporated by reference.

The invention is illustrated by the following examples but is not limited thereto.

EXAMPLE 1

Preparation of methyl 9-oxa-3,7,11-trimethyl-2,4-dodecadienoate (a) 5-oxa-3,7-dimethyloctanal: Chromium trioxide (4.0 g.) is added portionwise under stirring and cooling with water and ice into absolute pyridine (45 ml.). The resulting mixture is treated dropwise at room temperature with a solution of 5-oxa-3,7-dimethyloctan-1-ol (2.5 g.) in pyridine (5 ml.) and the stirring is continued for 3–4 hours. The mixture is then diluted with water (100 ml.) and extracted with five 30 ml. portions of light petroleum. The extracts are combined, washed successively with aqueous 3% sulfuric acid, water, aqueous sodium hydrogen carbonate, and water again, dried and evaporated. The crude residue (1.9 g.) is distilled at 115–122° C./11 mm. Hg (bath temperature) to afford 1.5 g. of 5-oxa-3,7-dimethyloctanal.

(b) Methyl 9-oxa-3,7,11-trimethyl-2,4-dodecadienoate: Methanolic sodium methoxide (obtained from 0.26 g. of sodium and 3.5 ml. of absolute methanol) is diluted with dimethylformamide (20 ml.) and the resulting solution is treated dropwise in a nitrogen atmosphere under stirring and cooling (water) with diethyl 3-methoxycarbonyl-2-methyl-2-propene-phosphonate (3.0 g.). After one hour, 5-oxa-3,7-dimethyloctanal (1.75 g.) is added dropwise under cooling with water and the stirring is continued at room temperature for additional one hour. The reaction mixture is then slowly heated up to 70° C. and held at this temperature for 4 hours. The mixture is poured onto ice, the alkalinity is weakened by the addition of acetic acid, and the product is extracted with four 20 ml. portions of light petroleum. The extracts are combined, washed with aqueous sodium hydrogen carbonate and water, dried and evaporated. The residual crude product (1.5 g.) is separated into isomers by chromatography on silica gel (50 g.) in a mixture of light petroleum and ether (92.8, v./v.). Overall yield of chromatographic fractions, 900 mg. The product is distilled at 130–135° C./0.07 mm. Hg (bath temperature) or 115–121° C./0.009 mm. Hg (bath temperature).

The biological effectiveness of novel compounds according to the present invention was evaluated on the basis of their insect juvenile hormone activity. The test substances were applied to the body surface of freshly moulted last instar larvae of *Dysdercus cingulatus*, *Pyrrhocoris apterus*, *Graphosoma italicum*, *Eurygaster integriceps*, *Galleria mellonella*, or pupae of *Tenebrio molitor* and *Leptinotarsa decemlineata* in a standard one-microliter drop of acetone or of a mixture of acetone and olive oil (9:1).

TABLE

Insect juvenile hormone activity of methyl-9-oxa-3,7,11-trimethyl-2,4-dodecadienoate in $ID_{50}$ units per specimen (topical application)

| Insect: | $ID_{50}$ units |
| --- | --- |
| *Dysdercus cingulatus* | 1 |
| *Graphosoma italicum* | 100 |
| *Galleria mellonella* | 5 |
| *Tenebrio molitor* | <10 |
| *Leptinotarsa decemlineata* | 5 |

The effect of the application was evaluated after the subsequent ecdysis according to the degree of preservation of juvenile structures with molted specimens. The activity is expressed in $ID_{50}$ activity units, which represent such an amount of the test substance in micrograms per specimen which causes, under the above-mentioned conditions, the formation of intermediates between larvae and adults (with hemipterans) or between pupae and adults (with bugs). The activity unit is, thus, such an amount of the test substance which leads to the formation of half-imaginal specimens.

The novel compounds according to the present invention may be used as contact or food insecticides in various application forms, such as sprays, dustings, aerosols, and the like, on suitable carriers analogously to other well-known insecticides.

The process according to the present invention may be used to prepare numerous other esters of 9-oxaalkadienoic acids. Some of them are listed below:

alkyl 9-oxa-3,7,11,11-tetramethyl-2,4-dodecadienoate,
alkyl 9-oxa-3,11-dimethyl-7-ethyl-2,4-dodecadienoate,
alkyl 9-oxa-3,7,11-trimethyl-2,4-tridecadienoate,
alkyl 9-oxa-3,11-dimethyl-7-ethyl-2,4-tridecadienoate,
alkyl 9-oxa-3,7,10-trimethyl-2,4-undecadienoate,
alkyl 9-oxa-3,7,10,10-tetramethyl-2,4-undecadienoate,
alkyl 9-oxa-3,7,10-trimethyl-2,4-dodecadienoate, and
alkyl 9-oxa-3,10-dimethyl-7-ethyl-2,4-dodecadienoate.

We claim:

1. A compound selected from those of the following Formula I:

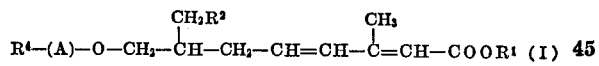

wherein, (A) is

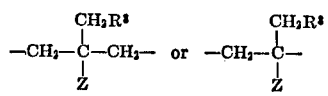

$R^1$ is lower alkyl consisting of 1–6 carbon atoms;
$R^2$ and $R^3$ is hydrogen or methyl;
$R^4$ is hydrogen or lower alkyl consisting of 1–3 carbon atoms; and
Z is hydrogen or methyl.

2. A compound according to claim 1 wherein (A) is

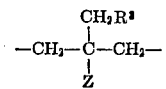

in which Z is hydrogen or methyl.

3. A compound according to claim 2 wherein Z is hydrogen.

4. A compound according to claim 3 wherein $R^1$ is lower alkyl of one to three carbon atoms.

5. A compound according to claim 4 wherein each of $R^2$, $R^3$ and $R^4$ is hydrogen.

6. A compound according to claim 2 wherein Z is methyl and $R^1$ is lower alkyl of one to three carbon atoms.

7. A compound according to claim 6 wherein each of $R^2$, $R^3$ and $R^4$ is hydrogen.

8. A compound according to claim 1 wherein (A) is

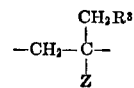

in which Z is hydrogen or methyl.

9. A compound according to claim 8 wherein $R^1$ is lower alkyl of one to three carbon atoms.

10. A compound according to claim 9 wherein each of $R^2$, $R^3$ and $R^4$ is hydrogen.

References Cited

UNITED STATES PATENTS 3,624,132   11/1971   Urry _____ 260—473 R

OTHER REFERENCES

Sláma: Insect Juvenile Hormone Analogues, Annual Review of Biochemistry 40, 1079–1102 (1971).

LEWIS GOTTS, Primary Examiner

D. G. RIVERS, Assistant Examiner

U.S. Cl. X.R.

260—602, 615 R; 424—312